United States Patent [19]
Brem

[11] 3,903,816
[45] Sept. 9, 1975

[54] METHOD AND MEANS OF PRODUCING GRASS SOD

[76] Inventor: Jack W. Brem, 2687 Chatsworth St., San Diego, Calif. 92120

[22] Filed: Feb. 8, 1974

[21] Appl. No.: 440,711

[52] U.S. Cl. ............................ 111/1; 111/10; 47/56
[51] Int. Cl.² .......................................... A01C 19/00
[58] Field of Search ............ 111/1, 10, 11, 85; 47/56

[56] References Cited
UNITED STATES PATENTS

| | | | |
|---|---|---|---|
| 2,876,013 | 3/1959 | Neff | 111/10 X |
| 3,180,290 | 4/1965 | Kapplemann et al. | 111/85 |
| 3,315,623 | 4/1967 | Tschudy, Jr. | 111/1 |
| 3,685,468 | 8/1972 | Paige et al. | 111/11 |

FOREIGN PATENTS OR APPLICATIONS

| | | | |
|---|---|---|---|
| 1,290,338 | 9/1972 | United Kingdom | 47/56 |

Primary Examiner—Stephen C. Pellegrino
Attorney, Agent, or Firm—Ralph S. Branscomb

[57] ABSTRACT

A means and method of growing grass sod wherein a layer of water-impervious material is applied to the surface on which the grass is to be grown to limit vertical root growth, a layer of growth medium is laid on the water-impervious material, and grass seed is supplied to and mixed with the growth medium.

4 Claims, 9 Drawing Figures

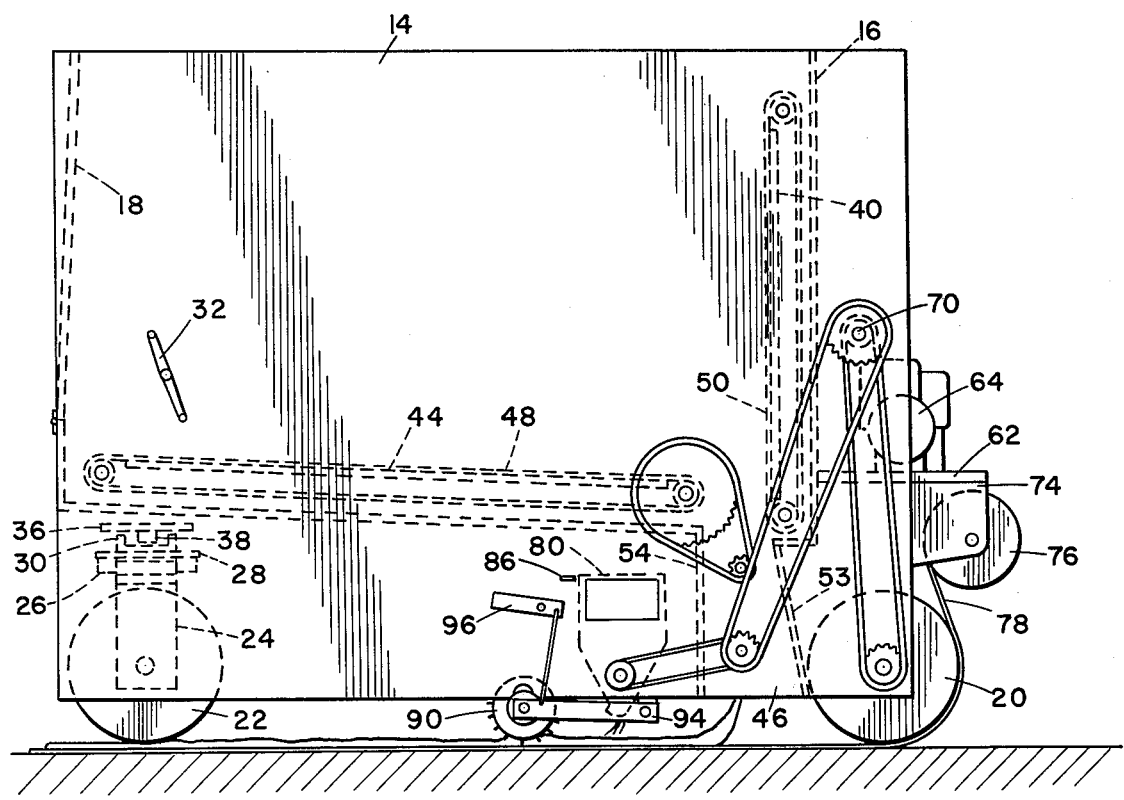
Fig. 1
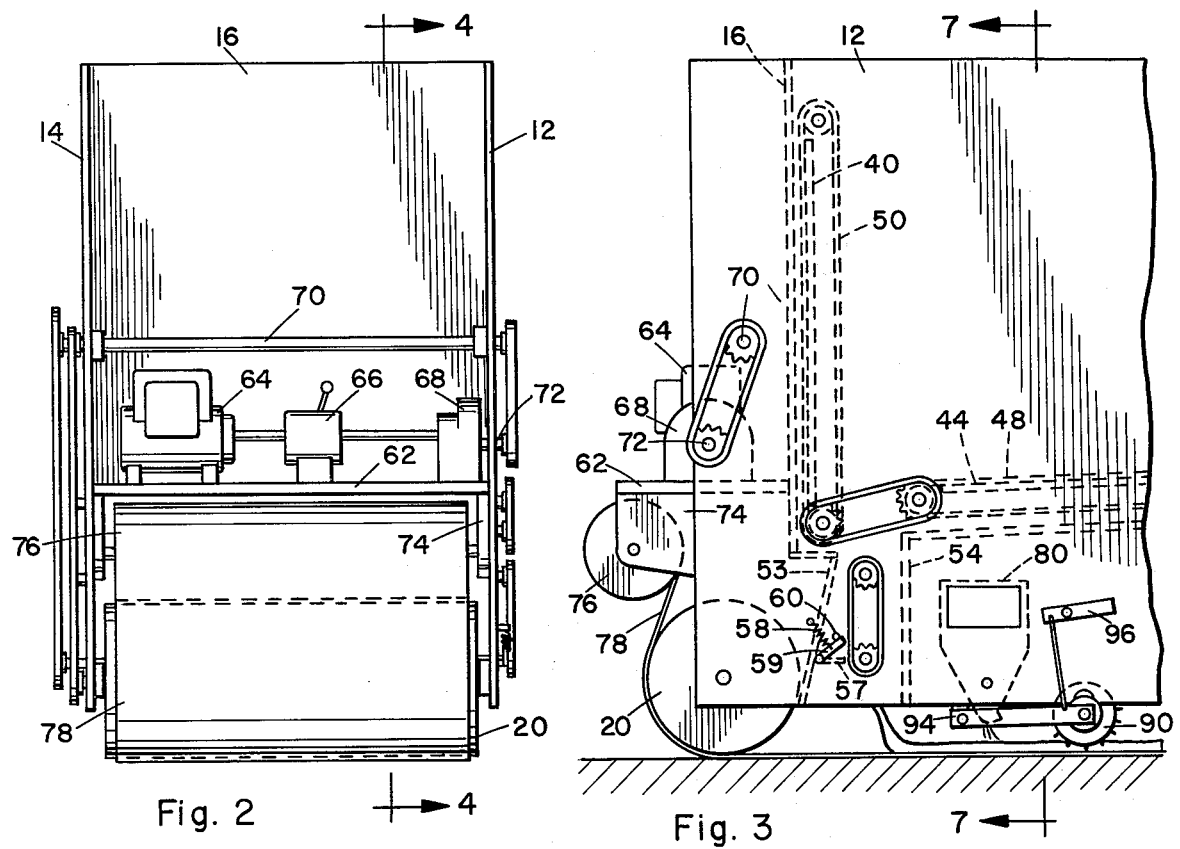
Fig. 2
Fig. 3

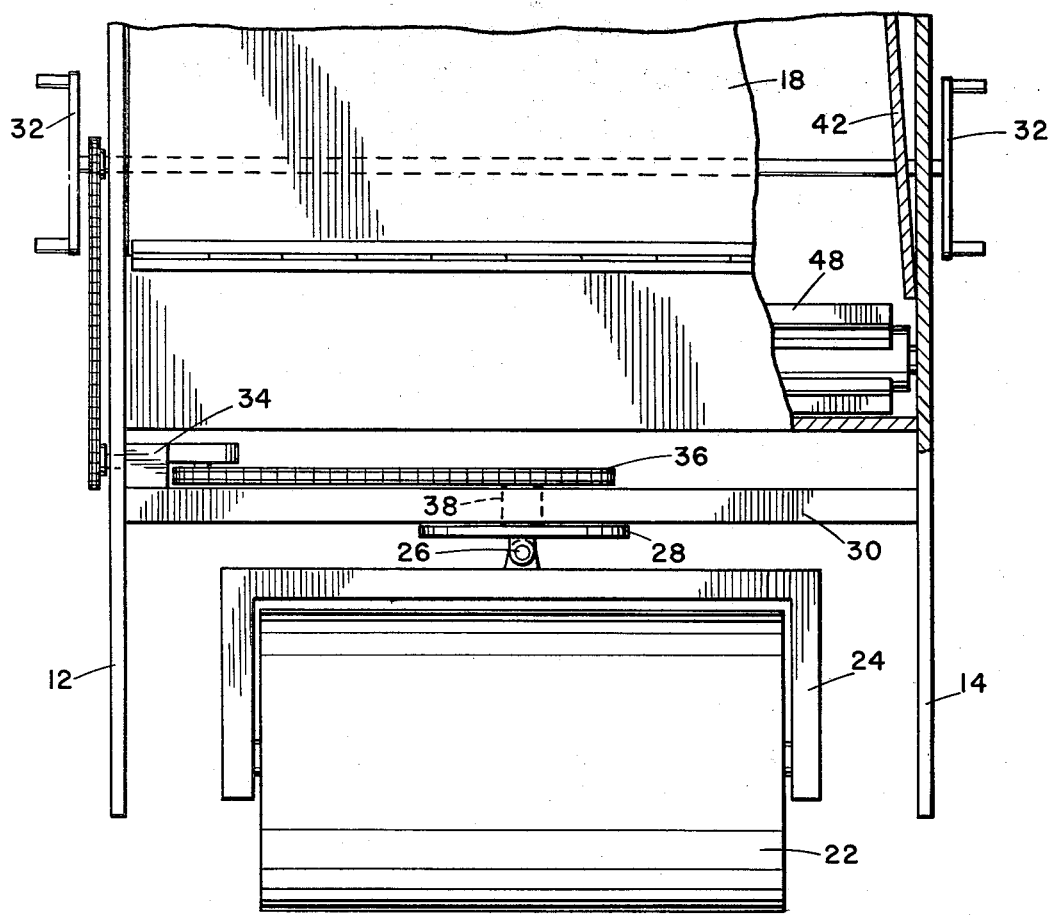
Fig. 6
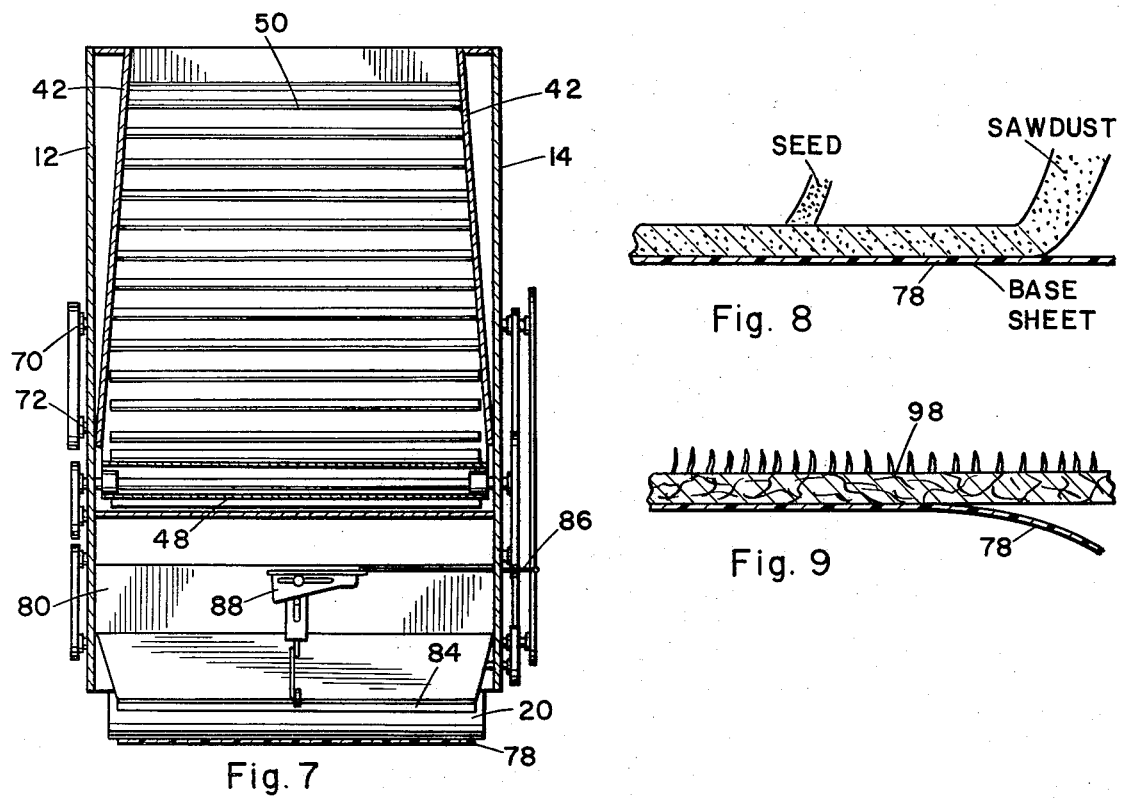
Fig. 7
Fig. 8
Fig. 9

3,903,816

METHOD AND MEANS OF PRODUCING GRASS SOD

BACKGROUND AND SUMMARY OF THE INVENTION

The invention pertains to the commercial production of grass sod and similar ground cover products such as a ivy and sweet alyssum, etc., hereinafter referred to collectively as grass.

Grass sod has been produced in an unchanged traditional manner ever since the inception of grass sod farming. The traditional manner entails planting and raising a grass crop until the roots are sufficiently interwoven that the sod will hang together as a cohesive carpet-like mat when cut. Cutting is accomplished by a machine which slices through the roots and soil about half an inch below the land surface, and the sod is then rolled up strip by strip. Required growing time ranges from about nine months under ideal conditions to as much as three years in northern climates.

The present invention is a method, and a means for its performance, for producing sod which is much lighter, superior in strength, and can be grown in about one-third the time required by conventional techniques.

Horticultural experiments have demonstrated that these results can be obtained by growing grass in a layer of growth medium on a water-impervious surface. Vertical root growth is thus limited, forcing the roots to grow entirely in the lateral direction, rapidly forming a cohesive sod mat. Without the water-impervious layer, the great bulk of root growth is in the vertical direction, making little contribution to sod strength and resulting in the loos of a large portion of the root structure when the sod is harvested. However, until the advent of the present invention, these experiments have not resulted in the development of techniques for producing the sod cheaply and in the large quantities required for an economically feasible commercial sod operation.

The instant invention is a method and means for applying a layer of water-proof material, such as sheet plastic from a roll, to the ground, simultaneously laying a layer of growth medium on the water-proof material, and seeding the growth medium. Water and plant food are then supplied until the sod mat has developed, and the sod is rolled up in strips with or without the plastic.

The invention has been used to produce sod in quantity in three months that is more cohesive than traditional sod and weighs from one-sixth to one-quarter as much. Labor costs have been considerably reduced because of the decreased culture period, and the cost of land has been cut by two thirds because of tripled productivity. In addition, the lighter-weight sod is more economically transported, distributed and re-planted. The relative thin sod carpet produced allows freer passage of moisture therethrough to the ground after re-planting so that the grass takes root very quickly in its new location.

BRIEF DESCRIPTION OF THE DRAWINGS

FIG. 1 is a side elevation view of the complete machine;

FIG. 2 is an end view as taken from the right hand end of FIG. 1;

FIG. 3 is a partial side view of the other side of the machine;

FIG. 6 is an enlarged end view as taken from the left-hand end of FIG. 1, with portions cut away;

FIG. 7 is a sectional view taken on line 7—7 of FIG. 3;

FIG. 8 is a sectional view showing the application of sawdust and seed to a base sheet; and FIG. 9 is a sectional view of the completed grass product.

DETAILED DESCRIPTION OF THE PREFERRED EMBODIMENT

Figure 4:
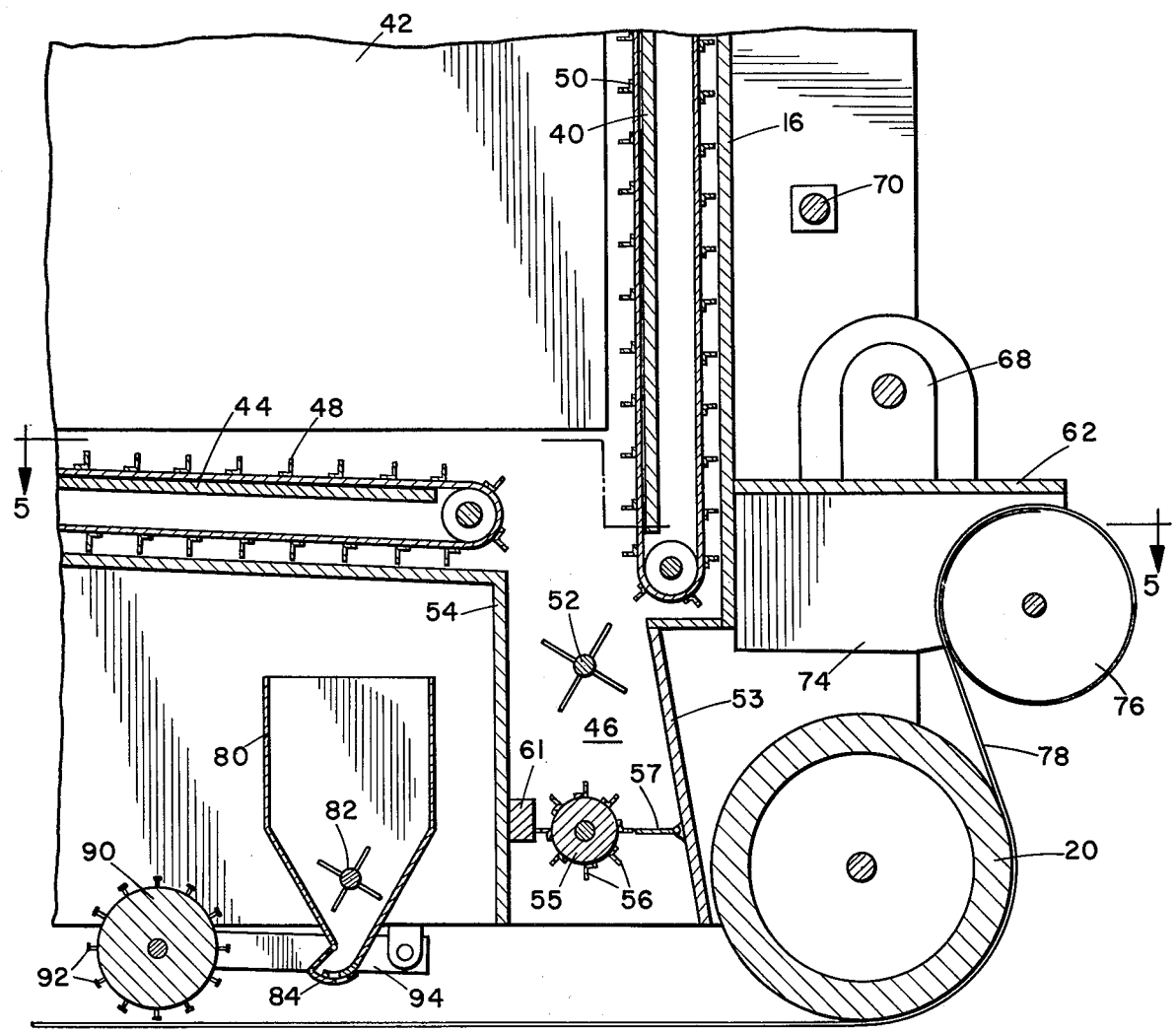
FIG. 4 is an enlarged sectional view taken on line 4—4 of FIG. 2.
Figure 5:
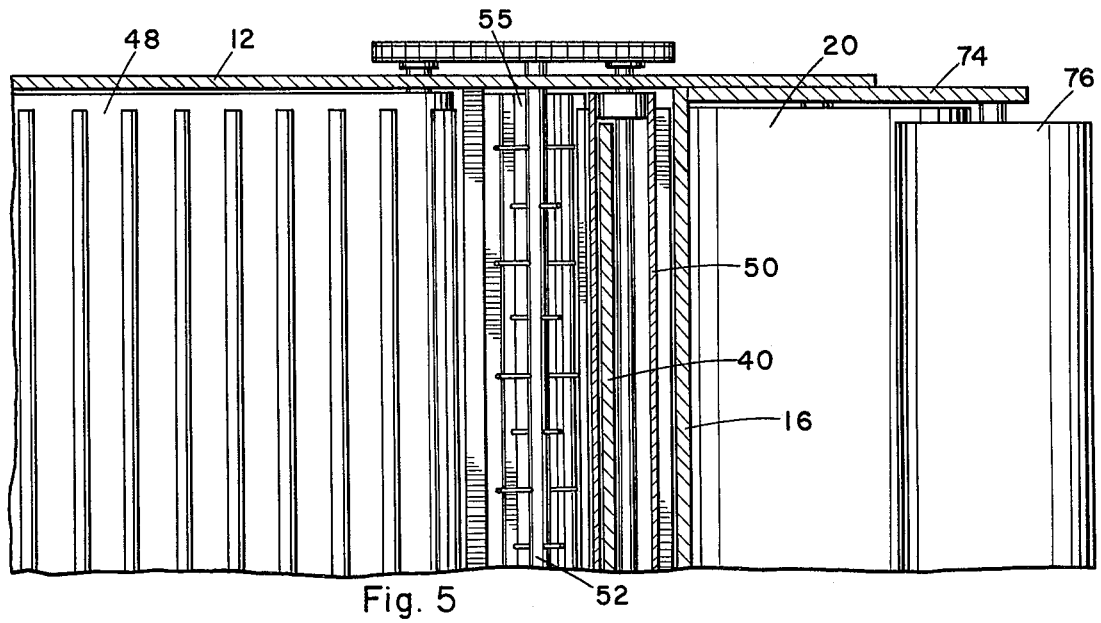
FIG. 5 is a sectional view taken on line 5—5 of FIG. 4.

The machine has a box-like body with rectangular side walls 12 and 14, a front wall 16 and an inclined, hinged, rear wall 18. Supporting the body are a front roller 20 mounted in the side walls and having a fixed rotational axis, and a rear steering roller 22 which is mounted on yoke 24. The yoke is pivotally attached at 26 to a bearing plate 28 which bears on a transverse support beam 30. The pivot at 26 is necessary to allow the steering roller to accomodate irregularities in the land surface because the axis of the front roller is fixed. Steering the machine from either side is possible by operating either of the cranks 32 which are chain-linked through a reduction gear box 34 to a large sprocket 36 which drives the bearing plate 28 through a vertical shaft 38. Any other suitable gearing mechanism or hydraulic system could be used in the steering system if desired.

Inside the body of the machine is a mulch hopper having a front wall 40, a rear wall defined by the body wall 18, and two side walls 42. The side and rear walls are shown as being inwardly inclined from the bottom to top to help prevent the material carried in the hopper from being jammed between the walls. The slight incline effectively prevents jamming which is otherwise a problem even in a large hopper of the type used.

The hopper has a floor 44 and a conveyor 48 operably mounted on the floor which moves forwardly very slowly when the machine is in operation to ensure an adequate supply of mulch in the chute 46. This compartment also should have inverted walls. The conveyor may be a continuous belt bearing parallel blades as shown, or simply a pair of parallel drive chains spanned by the blades.

Another similar conveyor 50 travels up the front wall 40 and serves the purpose of keeping the mulch in the chute loose by preventing excess pressure build-up resulting from the action of the floor conveyor. To further ensure that the texture of the mulch material remains loose, an agitator 52 is mounted in the chute.

The chute 46 spans the width of the machine and has front wall 53 which slopes outwardly toward the bottom, and a rear wall 54 which is illustrated as vertical but may also slope outwardly toward the bottom. The slopes of the walls serve the same purpose as the incline of the hopper walls, which is to facilitate free flow of the mulch and prevent jamming.

Near the bottom of the chute is a proportioner 55 which rotates at an adjustable speed to dispense the desired quantity of mulch material as the machine moves. The proportioner is comprised of a cylindrical drum having elongated radial blades 56 which metes out the exact quantity of mulch necessary to produce a mulch blanket of the desired thickness. A horizontally extended flap 57 adjacent to the blade tips ensures the accuracy of the amount of mulch dispensed. The flap is pivoted at its forward edge between the walls of the machine and is upwardly biased by a spring 58 which is attached to an arm 59 which connects with the flap. A pin 60 prevents the flap from pivoting upwardly, and the spring permits the flap to pivot downwardly so that stones or other over-sized objects inadvertently admitted to the hopper may be passed out of the chute without damage to the machine mechanism. A bar 61 mounted on the rear chute wall backs the proportioner and prevents the passage of uncontrolled quantities of mulch.

Projecting from the front wall 16 of the machine is a horizontal shelf 62 which supports a motor 64 and a drive train comprising a transmission 66 and a reduction gear box 68. A lay shaft 70, chaindriven by the sprocketed shaft 74 of the gear box, serves as the power take-off shaft for all the sub-assemblies of the machine.

Two vertical walls 74 projecting from the front wall of the machine beneath the shelf 62 support a roll 76 of plastic sheet material 78. As the machine traverses the ground, the plastic is drawn from the roll and laid beneath the roller 20 in a strip. At the same time a layer of growth medium or mulch is deposited on the strip from the chute at a controlled rate.

Mounted behind the mulch chute is a standard commercial seeder 80 having an agitator 82 and a variable dispensing opening determined by the sliding plate 84 which is provided with apertures which fall into varying degrees of alignment with similar apertures on an overlying plate as the sliding plate moves. This adjustment is controlled externally of the machine by a pushed 86 which operates the plate through the linkage 88, illustrated in FIG. 7. Other types of seed dispensing could be used.

The seeds are pressed into the mulch layer by a roller 90 which has a multiplicity of spaced radially projecting spikes 92 which project about one-fourth inch externally of the roller surface. The spiked roller is mounted on a pair of radial arms 94, allowing the roller to ride evenly on top of the mulch. A lever 96 connected to one of the radial arms by chain is provided to withdraw the roller when not in use and while turning. Alternatively a serier of discs on a shaft can be used to roll the seeds into the mulch, although the former apparatus has proven somewhat more effective.

The conveyors, rollers, agitators and the proportioner can be driven in any appropriate manner. In the illustrated embodiment they are all provided with sprocketed shafts, which are chain-driven externally of the body of the machine. Some of the shafts may be provided with clutch mechanisms.

The plastic sheet 78 is effective to prevent penetration of the grass roots, but other materials could be used with substantially the same results, tarpaper being one example. It is also contemplated that the plastic roll could be replaced by a plastic spray apparatus which coats the surface ahead of the machine with a film of quick-drying liquid plastic.

The mulch used may be any appropriate growth medium, such as sawdust, shredded paper, manure, or other locally available light weight material, such as Pearlite, etc. In the illustrated embodiment, sawdust is used, and a seeded sawdust layer is shown in the process of formation in FIG. 8. The machine is used to cover an entire field strip-by-strip in this fashion, and the resulting mulch blanket is watered and nutered until the grass roots 98 form a cohesive mat or carpet as illustrated in FIG. 9. The strips are then rolled up with or without the plastic sheet, ready for sale.

I claim:

1. A machine for producing a seeded mulch blanket for growing grass and other ground cover products on a surface comprising:
    a. a machine body movable in a forward direction over the surface;
    b. means mounted in said body for applying water-impervious material to the surface as the body moves;
    c. means mounted in said body for laying a layer of growth medium of generally uniform thickness on said water-impervious material;
    d. a seeder for distributing seeds on said growth medium layer; and 2. A machine according to claim 1 and including a mulch hopper which opens into a chute through which growth medium is dispensed;
    said chute having at least one wall which inclines outwardly from top to bottom to promote the even flow of mulch therethrough.

3. A machine according to claim 1 wherein said body includes a hopper for growth medium, and said hopper having upstanding walls at least one of which is inclined inwardly from bottom to top to prevent wedging of the growth medium between the walls.

4. A machine according to claim 3 wherein said hopper has a floor with a dispensing opening therein adjacent one of said upstanding walls, and including a horizontal conveyor having generally vertical, parallel blades and means for drawing same across said floor toward the opening therein to move growth medium across the floor toward the opening, and a vertical conveyor having generally horizontal parallel blades and means for drawing same upwardly on a wall adjacent said opening for lifting excess growth medium away from the opening.

* * * * *

UNITED STATES PATENT OFFICE
CERTIFICATE OF CORRECTION

Patent No. 3,903,816      Dated September 9, 1975

Inventor(s) Jack W. Brem

It is certified that error appears in the above-identified patent and that said Letters Patent are hereby corrected as shown below:

Column 1, line 35, "loos" should read -- loss --.

Claim 1, add paragraph (e)

(e) a seed-mixer roller rotationally mounted beneath a rear portion of said body and operable to roll on said layer of growth medium, said roller having generally radially projecting seed commingling elements extending therefrom of length less than the thickness of said layer of growth medium whereby said water impervious material is left intact by said roller.

Signed and Sealed this second Day of December 1975

[SEAL]

Attest:

RUTH C. MASON
*Attesting Officer*

C. MARSHALL DANN
*Commissioner of Patents and Trademarks*